United States Patent [19]
Enomoto

[11] Patent Number: 6,034,759
[45] Date of Patent: Mar. 7, 2000

[54] IMAGE PROCESSING APPARATUS AND PHOTOGRAPHIC PRINTING APPARATUS

[75] Inventor: Jun Enomoto, Kanagawa, Japan

[73] Assignee: Fuji Photo Film Co., Ltd., Kanagawa, Japan

[21] Appl. No.: 09/039,232

[22] Filed: Mar. 16, 1998

[30] Foreign Application Priority Data

Mar. 21, 1997 [JP] Japan ...................................... 9-068677

[51] Int. Cl.$^7$ ............................. G03B 27/52; G06K 9/00
[52] U.S. Cl. ................................ 355/41; 355/40; 382/171
[58] Field of Search ........................... 355/27–29, 40, 355/41; 382/169, 171, 168; 358/75, 76, 78; 348/155, 169, 170

[56] References Cited

U.S. PATENT DOCUMENTS

| | | | |
|---|---|---|---|
| 4,958,217 | 9/1990 | Kimura et al. ........................... | 358/75 |
| 5,450,503 | 9/1995 | Ogino et al. ............................ | 382/103 |
| 5,539,523 | 7/1996 | Nakai et al. ............................ | 358/296 |
| 5,710,590 | 1/1998 | Ichige et al. ............................ | 348/14 |
| 5,802,535 | 9/1998 | Shibuta .................................. | 707/523 |
| 5,805,723 | 9/1998 | Fujiwara ................................ | 382/172 |
| 5,831,748 | 11/1998 | Tsukada et al. ........................ | 358/455 |
| 5,844,226 | 12/1998 | Suzuki .................................. | 235/462 |

*Primary Examiner*—Alan A. Mathews
*Assistant Examiner*—Hung Henry Nguyen
*Attorney, Agent, or Firm*—Sughrue, Mion, Zinn Macpeak & Seas, PLLC

[57] ABSTRACT

There is provided an image processing apparatus including a first principal portion extracting device which extracts a principal portion of an image based on image data, a display device which displays an extraction result of the principal portion of the image extracted by the first principal portion extracting device, input device for inputting first instruction information for indicating whether the extraction result displayed on the display device is correct and also inputting second instruction information for indicating a region to be newly extracted as a principal portion, and second principal portion extracting device which extracts a new principal portion based on the second instruction information inputted by the input device.

20 Claims, 9 Drawing Sheets

IMAGE PROCESSING APPARATUS AND PHOTOGRAPHIC PRINTING APPARATUS

BACKGROUND OF THE INVENTION

1. Field of the Invention

The present invention relates to an image processing apparatus and a photographic printing apparatus, and particularly to an image processing apparatus which effects image processing based on image data and a photographic printing apparatus which allows an image recorded on a photographic film to be printed onto a photographic printing paper.

2. Description of the Related Art

There has been conventionally known a photographic printing apparatus in which an image recorded on a photographic film is printed onto a photographic printing paper.

When a film image is printed onto a photographic printing paper in the photographic printing apparatus, a high-quality photograph (print) can be prepared with the principal portion of a subject (in most cases of general photography, a person's face) printed with normal coloring.

For this reason, in the conventional photographic printing apparatus, the principal portion of the subject is automatically extracted from the film image, and based on density data of the extracted principal portion, an amount of exposure is determined so that the principal portion is printed with normal coloring.

However, when the principal portion of the subject is automatically extracted from the film image, the correct principal portion is not necessarily extracted. Particularly, when an image is recorded on a film in an unusual state (for example, underexposure, overexposure, backlighting, or high-contrast state), it is not rare for an incorrect portion to be extracted. In this case, the amount of exposure is determined based on density data of an incorrectly extracted region. Therefore, there is a drawback in that high-quality photographs cannot be prepared.

SUMMARY OF THE INVENTION

The present invention has been devised in order to solve the above-described drawbacks. The object of the present invention is to provide an image processing apparatus which can reliably extract a principal portion of a subject and also provide a photographic printing apparatus which allows optimum printing processing by determining an amount of exposure based on the principal portion extracted by using the image processing apparatus.

In order to achieve the above-described object, there is provided an image processing apparatus according to a first aspect of the present invention, which comprises first principal portion extracting means which extracts a principal portion of an image based on image data; display means which displays an extraction result of the principal portion of the image extracted by the first principal portion extracting means; input means for inputting first instruction information for indicating whether the extraction result displayed on the display means is correct and also inputting second instruction information for indicating a region to be newly extracted as a principal portion; and second principal portion extracting means which extracts a new principal portion based on the second instruction information inputted by the input means.

According to the image processing apparatus of the first aspect, the principal portion of the image is extracted by the first principal portion extracting means based on the image data. Meanwhile, in this case, the principal portion of the image is previously set by an operator or the like. Further, as the method for extracting the principal portion of the image, conventional extracting methods can be applied singly or in combination.

When the principal portion of the image is automatically extracted by the first principal portion extracting means, the extraction result is displayed on the display means. As the method for indicating the extraction result on the display means in this case, for example, there can be applied a method of indicating coordinate data which indicates the position of the extracted principal portion, a method in which an entire image is displayed on the display means and the position corresponding to the principal portion in the displayed image is marked, and the like.

When the extraction result of the principal portion is displayed on the display means and the principal portion is proper, an operator inputs, by the input means, first instruction information which indicates that the extraction result is correct. Further, when the principal portion is not proper, the operator inputs, by the input means, the first instruction information which indicates that the extraction result is not correct and also inputs, by the input means, second instruction information which indicates a region of a proper principal portion. When the second instruction information is inputted, a new principal portion is extracted by the second principal portion extracting means based on the second instruction information.

As described above, according to the image processing apparatus of the first aspect of the present invention, the operator determines whether the extracted principal portion is proper by visually viewing the principal portion extracted by the first principal portion extracting means and displayed on the display means. For this reason, the principal portion to be extracted can be reliably extracted. For example, when color correction of a color image is effected, optimum color correction can be achieved by effecting processing so as to allow the principal portion to have a proper color based on the image data of the extracted principal portion.

Meanwhile, the above-described principal portion is preferably a person's face. Further, the above-described input means may be formed from the first instruction information input means for inputting the first instruction information and the second instruction information input means for inputting the second instruction information.

In accordance with a second aspect of the present invention, there is provided a photographic printing apparatus comprising: photometric means which photometrically measures an image recorded on a photographic film; first principal portion extracting means which extracts a principal portion of the image based on photometric data obtained by the photometric means; display means which displays an extraction result of the principal portion of the image extracted by the first principal portion extracting means; input means for inputting first instruction information for indicating whether printing is to be effected and second instruction information for indicating a region to be newly extracted as a principal portion; second principal portion extracting means which extracts a new principal portion based on the second instruction information inputted by the input means; and printing control means in which when the first instruction information which indicates that the printing is to be effected is inputted by the input means, an exposure amount is determined based on photometric data of the principal portion of the image extracted by the first principal portion extracting means, and when the second instruction information is inputted, an exposure amount is determined based on photometric data of the principal portion of the image extracted by the second principal portion extracting means.

According to the photographic printing apparatus of the second aspect of the present invention, photometric data of the image recorded on the photographic film is obtained by photometric means and the principal portion of the image is extracted by the first principal portion extracting means based on the photometric data. Meanwhile, in this case, the principal portion of the image is the portion where color reproduction is required most faithfully in an image and is previously set by an operator or the like. Further, as the method for extracting the principal portion of the image, conventional extracting methods can be applied singly or in combination.

When the principal portion of the image is automatically extracted by the first principal portion extracting means, the extraction result is displayed on the display means. In this case, as the method of indicating the extraction result on the display means, for example, there can be applied a method of indicating coordinate data which indicates the position of the extracted principal portion, a method in which an entire image is displayed on the display means and the position corresponding to the principal portion in the displayed image is marked, and the like.

When the extraction result of the principal portion is displayed on the display means and the principal portion is proper, an operator inputs, by the input means, first instruction information which indicates that printing is to be automatically allowed. When the principal portion is not proper, the operator inputs, by the input means, first instruction information which indicates that printing is not to be automatically effected and also inputs, by the input means, second instruction information which indicates a region of a proper principal portion. When the second instruction information is inputted, a new principal portion is extracted by the second principal portion extracting means based on the second instruction information.

On the other hand, when the first instruction information which indicates that printing is to be effected is inputted by the input means, an exposure amount is determined by the printing control means based on the photometric data of the principal portion extracted by the first principal portion extracting means. When the second instruction information is inputted, an exposure amount is determined by the printing control means based on the photometric data of the principal portion extracted by the second principal portion extracting means so as to allow printing control.

As described above, according to the photographic printing apparatus of the second aspect of the present invention, the operator determines whether the extracted principal portion is proper by visually viewing the principal portion extracted by the first principal portion extracting means and displayed on the display means. For this reason, the principal portion to be extracted can be reliably extracted and optimum printing processing can be achieved by determining an exposure amount based on the extracted principal portion.

In accordance with the third aspect of the present invention, there is provided a photographic printing apparatus comprising: photometric means which photometrically measures an image recorded on a photographic film; first principal portion extracting means which extracts a principal portion of the image based on photometric data obtained by the photometric means; determination means which determines whether printing is automatically effected based on at least one of the photometric data obtained by the photometric means and an extraction result obtained by the first principal portion extracting means; display means which, when printing is not automatically effected, displays the extraction result of the principal portion of the image extracted by the first principal portion extracting means; input means for inputting, with the extraction result of the principal portion of the image extracted by the first principal portion extracting means being displayed on the display means, first instruction information for indicating whether printing is to be effected and second instruction information for indicating a region to be newly extracted as a principal portion; second principal portion extracting means for extracting a new principal portion based on the second instruction information inputted by the input means; and printing control means in which when the first instruction information which indicates that printing is to be effected is inputted by the input means or when it is determined by the determination means that printing is to be automatically effected, an exposure amount is determined based on photometric data of the principal portion of the image extracted by the first principal portion extracting means, and when the second instruction information is inputted, an exposure amount is determined based on photometric data of the principal portion of the image extracted by the second principal portion extracting means.

According to the photographic printing apparatus of the third aspect of the present invention, photometric data of the image recorded on the photographic film is obtained by the photometric means and the principal portion of the image is extracted by the first principal portion extracting means based on the photometric data. It is determined by the determination means whether printing is to be automatically effected based on at least one of the photometric data and the extraction result obtained by the first principal portion extracting means. As the result of the above determination, when it is determined that printing is not to be automatically effected, the extraction result of the principal portion extracted by the first principal portion extracting means is displayed on the display means.

When the extraction result of the principal portion is displayed on the display means and the principal portion is proper, an operator inputs, by the input means, first instruction information which indicates that printing is to be automatically effected. When the principal portion is not proper, the operator inputs, by the input means, first instruction information which indicates that printing is not to be automatically effected and also inputs, by the input means, second instruction information which indicates a region of a proper principal portion. When the second instruction information is inputted, a new principal portion is extracted by the second principal portion extracting means based on the second instruction information.

On the other hand, when the first instruction information which indicates that printing is to be effected is inputted by the input means or when it is determined by the determination means that printing is to be automatically effected, an exposure amount is determined by the printing control means based on the photometric data of the principal portion extracted by the first principal portion extracting means. When the second instruction information is inputted, an exposure amount is determined by the printing control means based on the photometric data of the principal portion extracted by the second principal portion extracting means so as to allow printing control.

As described above, according to the photographic printing apparatus of the third aspect of the present invention, in addition to the operation of the photographic printing apparatus of the above-described second aspect, it is determined by the determination means whether printing is to be automatically effected based on at least one of the photometric data and the extraction result obtained by the first principal portion extracting means. When it is determined that printing is to be automatically effected, determination of an exposure amount and automatic printing are effected with no display of the extraction result on the display means, with no input of each of instruction information by the input means, and with no extraction of a new principal portion by the second principal portion extracting means. For this reason, as compared with the photographic printing apparatus described in the third aspect of the present invention, the time to the completion of printing can be reduced.

Meanwhile, the above-described principal portion is preferably a person's face. Further, the above-described input means may be formed from the first instruction information input means for inputting the first instruction information and the second instruction information input means for inputting the second instruction information.

In each of the first, second, and third aspects of the present invention, when the principal portion displayed on the display means is not proper, the second instruction information input means may be used as the first instruction information input means. As a result, input of the first instruction information can be omitted and the second instruction information can be directly inputted.

DESCRIPTION OF THE PREFERRED EMBODIMENTS

Referring now to the attached drawings, embodiments of the present invention will be hereinafter described in detail.

[First Embodiment]

Figure 1:
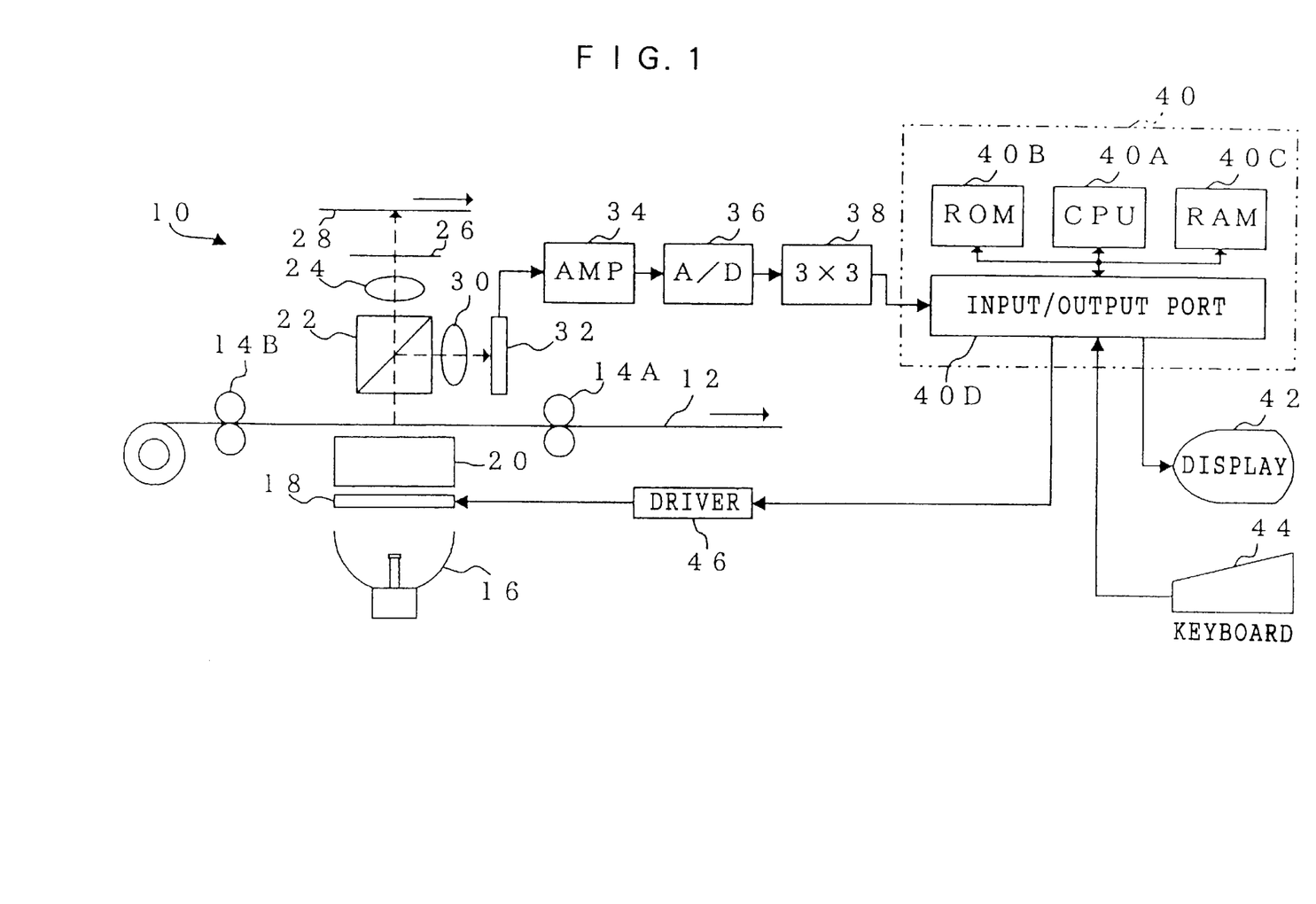
FIG. 1 is a schematic block diagram of a photographic printing apparatus according to an embodiment of the present invention.

FIG. 1 shows a photographic printing apparatus 10 to which an image processing apparatus according to the embodiments of the present invention is applied. The photographic printing apparatus 10 includes a light source 16 which emits light for exposure by which an image recorded on a negative film 12, which is used as a photographic film, is printed. A color correction filter 18 such as a light adjusting filter, a diffusion chamber 20, and a distribution prism 22 are arranged sequentially from the side where light is emitted from the light source 16.

A conveying path of the negative film 12 is formed between the diffusion chamber 20 and the distribution prism 22. The distribution prism 22 is used to distribute light transmitted through the negative film 12 in two directions. A negative carrier (not shown) is provided between the diffusion chamber 20 and the distribution prism 22. The negative carrier is provided with conveying roller pairs 14A, 14B which are disposed along the conveying path of the negative film 12 with the optical axis of the light source 16 being interposed therebetween. The conveying roller pairs 14A, 14B are each connected to a driving shaft of a motor (not shown) and are each provided to rotate due to driving force of the motor being transmitted thereto to convey the negative film 12.

A projective optical system 24, a black shutter 26, and a color paper (photographic printing paper) 28 are arranged sequentially on one of the optical paths of light distributed in two directions by the distribution prism 22 and a projective optical system 30 and a CCD image sensor 32 serving as photometric means are arranged sequentially on the other optical path. The CCD image sensor 32 effects photometric processing in such a manner as to divide an entire image (i.e., one frame) recorded on the negative film 12 into a large number of pixels (for example, 256×256 pixels) and further separate each of the pixels into three colors of red (R), green (G), and blue (B).

An amplifier 34 for amplifying a signal outputted from the CCD image sensor 32, an analog-digital (A/D) converter 36 for converting an analog signal to a digital signal, and a 3×3 matrix circuit 38 for correcting the sensitivity of the CCD image sensor 32 are arranged sequentially at an output end of the signal from the CCD image sensor 32. The 3×3 matrix circuit 38 is connected to an input/output port 40D of a control section 40 formed by a microcomputer and its peripheral equipment. The control section 40 includes CPU 40A, ROM 40B, RAM 40C, and the input/output port 40D, which are connected together via a bus.

The input/output port 40D of the control section 40 is connected to the color correction filter 18 via a driver 46 which drives the color correction filter 18. Connected to the input/output port 40D are a display 42 and a keyboard 44. The display 42 is used as display means formed from LCD or CRT and the keyboard 44 is used as input means for an operator to input various information.

Figure 2:
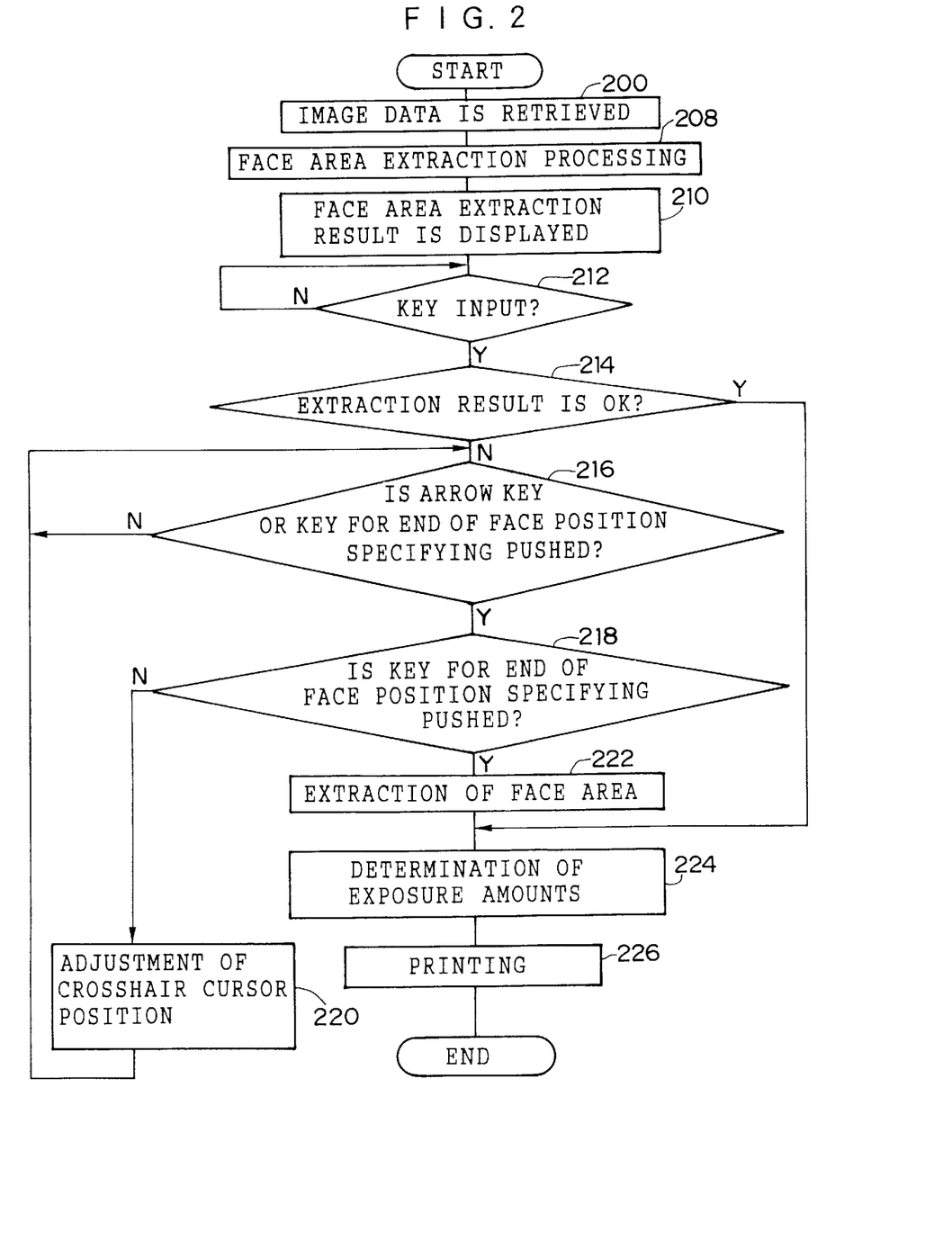
FIG. 2 is a flow chart which shows the flow of a printing control routine of a first embodiment of the present invention.

Next, operation of the first embodiment will be described with reference to the flow chart shown in FIG. 2. Meanwhile, the flow chart shown in FIG. 2 is stored, as a printing control routine, in ROM 40B (storage medium) and is executed in the control section 40 each time the negative film 12 set in the photographic printing apparatus 10 is conveyed in a predetermined direction and an image recorded on the negative film 12 is positioned at an exposure position.

In step 200, the image positioned at the exposure position is subjected to photometric processing by the CCD image sensor 32, image data outputted from the CCD image sensor 32 via the amplifier 34, the A/D converter 36, and the 3×3 matrix circuit 38 and provided as photometric data of a fixed resolution for each of red, green, and blue is taken in, and the taken-in image data is temporarily stored in a memory such as RAM 40C.

In the subsequent step, 208, face-region extraction processing is effected in which a person's face region is extracted from the image data stored in the memory. Step 208 functions as first principal-portion extraction means. The face-region extraction processing will be hereinafter described in detail with reference to the flow chart shown in FIG. 3.

Figure 3:
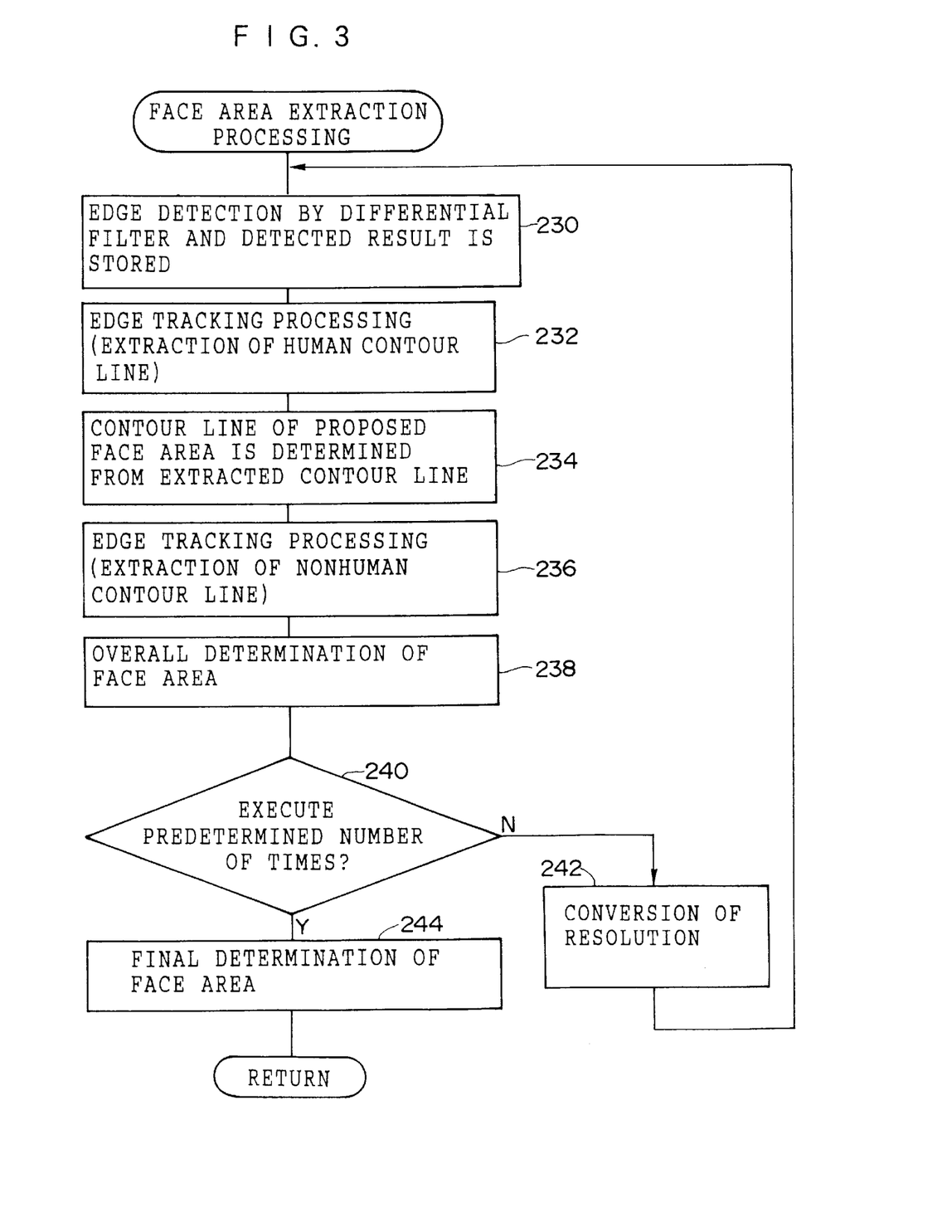
FIG. 3 is a flow chart which shows the flow of face-region extraction processing.

First, in step 230, the image data stored in the memory is fetched and density variation values (edge intensities) along the direction of eight pixels (the so-called eight neighboring pixels) disposed around each pixel provided as a central pixel are calculated for each of the pixels by using a differential filter such as a Sobel.

Further, in step 230, the edge intensities along the above directions are compared for each of the central pixels and an absolute maximum value of the edge intensity is stored as the edge intensity of the central pixels, and further, a direction perpendicular to the direction in which an absolute value of edge intensity becomes maximum (i.e., assuming that a pixel to be processed exists on an outline of a certain region, the direction in which the outline extends) is stored as an edge direction of the central pixel.

In the subsequent step, 232, edge tracking processing is effected based on the edge intensity and the edge direction of each of the pixels stored in step 230 to allow extraction of an outline of a person (i.e., each outline of a face, a body, arms, legs, and the like). The outline of a region corresponding to a person is generally rounded. Therefore, the outline of the region corresponding to a person is extracted by limiting the edge tracking direction so that only a rounded outline is extracted. In this case, the extracted region is labeled and the position of the extracted region is stored in a predetermined area in RAM 40C correspondingly to the value of labeling.

In step 234, it is determined whether the outline extracted in step 232 corresponds to a person's face. In this case, the shape of the region which is supposed to correspond to a person's face is generally a circle or an ellipse, of which aspect ratio is set in a predetermined range, and therefore, when the extracted outline is formed from at least a predetermined number (for example, five or more) of directional components and the aspect ratio thereof is set within the predetermined range, it is determined that the extracted outline is that of a proposed face region, and when the extracted outline is formed from directional components of less than the predetermined number, i.e., it is one line other than a circle or ellipse, or it is a circle or ellipse, of which aspect ratio is set outside the predetermined range, it is determined that the extracted outline is that for the proposed face region.

In step 236, edge tracking processing is effected based on the edge intensity and the edge direction of each of the pixels stored in step 230 and an outline of a region other than a person's region (i.e., nonhuman region) is extracted. In most cases, the outline of the nonhuman region extends substantially straight or is bent substantially at a right angle in a predetermined portion. For this reason, by effecting the edge tracking processing so as to allow extraction of such outlines, the outline of the nonhuman region is extracted.

In step 238, an outline having a possibility of not being an outline of a region corresponding to a person's face is removed, based on the processing result of step 236, from the outlines determined as those of the proposed face region in step 234, and an outline of a region (face region) having a high probability of being the region corresponding to the person's face is determined.

The above determination is made based on whether the outline determined as that of the proposed face region in step 234 crosses the outline of the nonhuman region extracted in step 236, or the like. When the outline of the proposed face region crosses the outline of the nonhuman region, the outline of the proposed face region is judged to have a high possibility of not being the outline of the region corresponding to the person's face and is removed. Further, in step 238, based on the outlines which have not been removed in the above determination, a circular or elliptical region enclosed with the above outline or a rectangular region circumscribing the above outline is set as the face region.

In step 240, it is determined whether or not the operation from step 230 to step 238 is effected a predetermined number of times. When the decision of step 240 is negative, the process proceeds to step 242, in which resolution of image data fetched and stored in step 200 in the flow chart shown in FIG. 2 is converted (lowered) by sampling data of each pixel at a predetermined interval or by displacing each block of pixels formed from m×n pixels to one pixel with respective average values of red, green, and blue of all pixels forming each block being used as values of red, green, and blue of each block. Thereafter, the process returns to step 230. As a result, until the decision of step 240 makes an affirmative, the operation from step 230 to step 238 (edge detection, edge tracking, face-region determination, and the like) is effected repeatedly while lowering resolution of image data at every operation.

When the operation from step 230 to step 238 is effected the predetermined number of times and step 240 is adjudged affirmative, the process proceeds to step 244, in which a final determination of the face region for determining a region having the highest probability of corresponding to the person's face is made. This final determination of the face region is made by determining consistency of the region corresponding to the person's face for each of a plurality of face region candidates extracted by the above-described operation based on whether a shape pattern peculiar to a person's predetermined portion exists at a location corresponding to the positional relationship between the person's face and the predetermined portion at a magnitude and a direction which each correspond to the face region candidates. As the above-described special shape pattern, for example, a shape pattern which represents the outline of a person's head portion, a shape pattern which represents the outline of a person's body portion, a shape pattern which represents an internal structure of a person's face, and the like can be applied.

When the shape pattern which represents the outline of a person's body portion is applied as the above-described special shape pattern, the outline of the person's body portion is located below the person's face and is mostly formed by a substantially bisymmetrical line pair. Accordingly, the substantially bisymmetrical line pair located below each of the proposed face regions extracted by the above-described operation is detected for each of the face region candidates and weighting factors corresponding to the number of the detected line pairs are given to the face region candidates. When the above-described operation is effected as the final determination of the face region in step 244, the face region candidate given the highest weighting factor in the above-described operation can be selected as the face region candidate having the highest probability of corresponding to the person's face.

When the final determination of the face region is completed, the face-region extraction processing is completed and the process proceeds to step 210 of the flow chart shown in FIG. 2.

Meanwhile, as the face-region extracting method which can be applied in the first embodiment, there are provided a face region candidate extracting system including the above method shown in the flow chart of FIG. 3, which determines a region supposed to correspond to a person's face in an image and extracts the region as the face region candidate; and a background portion removing method which determines a region corresponding to a background in an image (background region) and extracts, as the face region candidate, other regions than the background region. Concretely, at least one of the following face region candidate extracting systems and background portion removing systems can be employed.

Example 1 of face region candidate extracting system:

It is determined whether, based on data (image data) obtained by separating, into three colors of red, green, and blue, each of a large number of measuring points into which an image is divided, each of the measuring points is included in a skin-color range on the color coordinates. The region in which a cluster (group) of the measuring points judged to be included in the skin-color range exists is extracted as the face region candidate.

Example 2 of face region candidate extracting system:

A histogram of a hue value (and a saturation value) is obtained based on the above image data and the obtained histogram is divided into raised portions. It is determined to which raised portion the measuring points each belong, and the measuring points are divided into groups corresponding to the divided raised portions. The image is divided into a plurality of regions for each of the groups, a region corresponding to a person's face is estimated among the plurality of regions and the estimated region is extracted as the face region candidate.

Example 3 of face region candidate extracting system:

Based on the above image data, any one of the shape patterns peculiar to person's various portions existing in the image (i.e., the shape patterns which represent the outline of the head portion, the outline of the face, the internal structure of the face, the outline of the body, and the like) is searched. In accordance with the size and direction of the detected shape pattern and the positional relationship between the person's predetermined portion represented by the detected shape pattern and the person's face, the region which is supposed to correspond to the person's face is set. Further, other shape patterns than the detected shape pattern are searched. The conformity with the person's face is sought for the previously set region and the face region candidate is thereby extracted.

Example 1 of background portion removing system:

It is determined whether, based on the above image data, each of the measuring points is included in the range of specified color which clearly belongs to the background on the color coordinates (for example, blue of the sky or the sea, green of grass or trees, and the like). The region in which the cluster (group) of measuring points judged to be included in the above specified color exists is judged as the background region and is removed. The remaining region is extracted as the non-background region (i.e., the region having a high possibility of including a region corresponding to the person's face).

Example 2 of background region removing system:

An image is divided into a plurality of regions based on the above image data in the same way as in the above-described Example 2 of principal portion extracting system, and thereafter, characteristic amounts of the region corresponding to the background (the ratio of a straight-line portion included in the outline, line symmetrical degree, number of irregularities, contact ratio for image external edge, density contrast within the region, with or without a variation pattern of density within the region, and the like) are obtained for each of the regions, and based on the obtained characteristic amounts, it is determined whether each of the regions is the background region. The region judged as the background region is removed and the remaining region is extracted as the non-background region (proposed face region).

Meanwhile, the above-described extracting systems are merely examples among many. Any extracting system provided to extract a face region from an image can of course be applied.

Figure 4A:
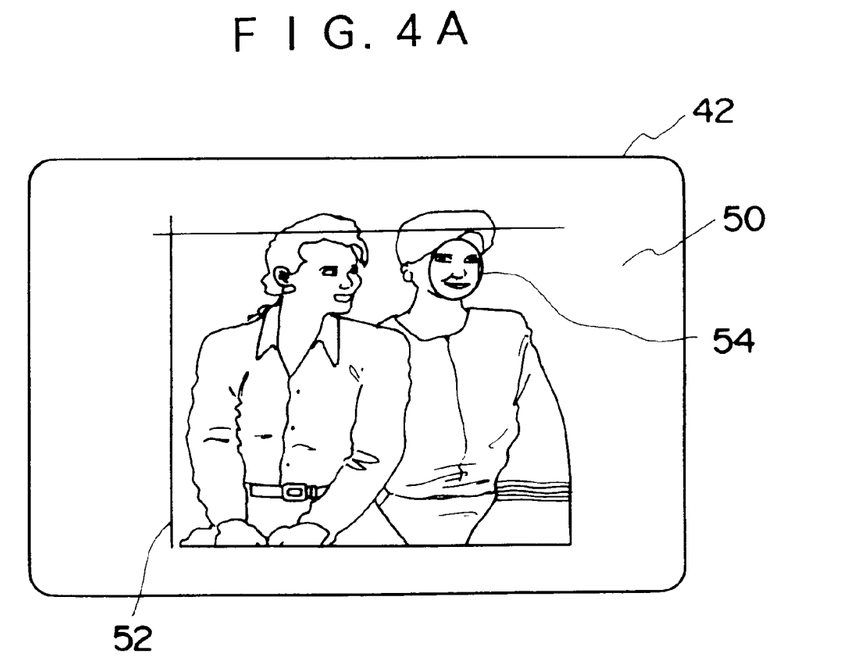
FIG. 4A is a schematic diagram which show the display state of a display.

When the face-region extraction processing is completed, in step 210, the face region having the highest weighting factor given in step 244 of the flow chart shown in FIG. 3 is displayed on the display 42 among the face regions extracted in the face-region extraction processing. FIG. 4A shows an example of display on the display 42 in the above case. As shown in FIG. 4A, an entire image 50 is indicated substantially at the central position of the display 42 and a substantially circular mark 54 is indicated in the area of the image 50 corresponding to the face region having the highest weighting factor. A crosshair cursor 52 for indicating an arbitrary position in the image 50 is indicated at a predetermined position on the display 42. The crosshair cursor 52 is formed by two straight lines, namely, the vertical straight line and the horizontal straight line. These straight lines can be moved in the vertical direction and in a horizontal direction in accordance with a press of arrow keys (not shown) of four types, which are disposed in the keyboard 44 and correspond to and indicate four directions, i.e., up, down, left, and right. An arbitrary position in the image 50 can be specified from the crossing position of the two straight lines.

When the extraction result of the face region is displayed on the display 42, in step 212, the keyboard 44 goes on key input standby. In this case, an operator determines, by referring to the extraction results of the face region displayed on the display 42, whether the extraction result is correct or not. When the extraction result is correct, a key (not shown) on the keyboard 44 for execution of printing is pressed. When the extraction result is not correct, a key other than the above execution indicating key is pressed. The control section 40 monitors the press state of the keyboard 44, and when any of the keys is pressed, the decision of step 212 is confirmed and the process proceeds to step 214.

Figure 4B:
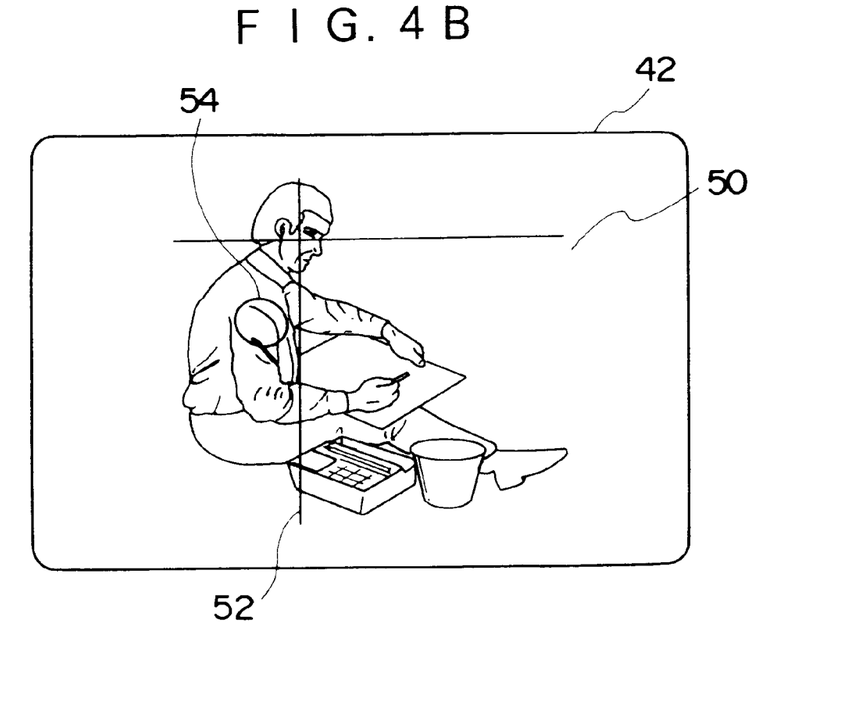
FIG. 4B is a schematic diagram which show the display state of a display.

In step 214, it is determined whether or not the key pressed in step 212 is that for indicating execution for printing. When the decision of step 214 is yes, the process proceeds to step 224, which will be described later. When the decision of step 214 is no, it is supposed that the extraction result of the face region obtained by the above face-region extraction processing has not been correct, and the process proceeds to step 216. FIG. 4B shows an example in which the extraction result of the face region obtained by the face-region extraction processing is not correct with the mark 54 being applied to a region from the arm to the shoulder of a person. In this case, a key of the keyboard 44 other than the key for indicating execution for printing is pressed by the operator, and therefore, the decision of step 214 is denied and the process proceeds to step 216.

When the decision of step 214 is denied, in step 216, the above-described arrow keys of four types for moving the crosshair cursor 52 or a face position specifying end key (not shown) which indicates completion of the face-position specifying goes on press standby. In this case, the operator presses each arrow key to move the crossing position of the crosshair cursor 52 toward the substantially central position of the face region and also presses the face position specifying end key (not shown) of the keyboard 44 at the time when the crossing position of the crosshair cursor 52 reaches the substantially central position of the face region. The control section 40 monitors the press state of the keyboard 44. At the point in time when each of arrow keys or the face position specifying end key is inputted, step 216 is confirmed and the process proceeds to step 218.

In step 218, it is determined whether or not the key inputted in step 216 is the face position specifying end key. When the decision of step 218 is no, it is supposed that the inputted key is any one of the arrow keys and the process proceeds to step 220, in which the crossing position of the crosshair cursor 52 is moved by a predetermined amount in accordance with the press state of each arrow key. Thereafter, the process returns to step 216. As a result, until the decision of step 218 is confirmed, namely, until the face position specifying end key is pressed, movement of the crossing position of the crosshair cursor 52 in accordance with the press state of each arrow key is effected repeatedly.

On the other hand, as shown in FIG. 4B, when the crossing position of the crosshair cursor 52 reaches the substantially central position of the face region and the face position specifying end key is pressed, the decision of step 218 makes an affirmative and the process proceeds to step 222, in which based on the crossing position of the crosshair cursor 52 at this point in time, the face region is extracted. In this case, extraction of the face region is effected by extracting a region including the crossing position of the crosshair cursor 52 positioned by the operation from step 216 to step 220 among the person's outline region extracted in step 232 of the above face region extraction processing. Meanwhile, the process of step 222 corresponds to the second principal portion extracting means of the present invention.

In the subsequent step 224, an exposure amount Ej (j is any one of R, G, and B, which applies correspondingly to the following) is calculated based on the image data of the face region extracted by the above-described processing and the average density Dj of an entire surface of the image. Meanwhile, the exposure amount Ej can be obtained by the following expression (1).

$$\text{Log } Ej = LMj \cdot CSj \cdot (DNj - Dj) + PBj + LBj + MBj + NBj + K_1 + K_2 \quad (1)$$

wherein, the above symbols are respectively as follows:

LM: magnification slope coefficient which is previously set in accordance with an enlargement ratio determined by the type of negative film and the print size CS: color slope coefficient which is provided for each type of negative film and is also set respectively for under-exposure and overexposure, which the color slope coefficient for underexposure or overexposure is selected by determining whether the average density of an image frame to be printed is under or over the standard negative density value.

DN: standard negative density value

D: average density value of an image frame to be printed

PB: correction balance value for a standard color paper determined in accordance with the type of color paper LB: correction balance value for a standard printing lens determined in accordance with the type of lens used for printing MB: correction value (master balance value) for variation in exposure amount and for change of paper development properties NB: negative balance (color balance) value which is determined by characteristics of a negative film $K_2$: color correction value $K_1$: density correction value represented by the following expression $$K_a \left\{ \frac{D_R + D_G + D_B}{3} - \frac{FD_R + FD_G + FD_B}{3} \right\} + K_b$$

Wherein, $K_a$ and $K_b$ are constants and FD represents a face-region average density. As a result, exposure amount Ej which allows proper printing of the face region is obtained.

When exposure amount Ej is obtained, in step 226, the calculated exposure amount Ej is outputted to the driver 46. The driver 46 moves, based on the inputted exposure amount Ej, the color correction filter 18 to a position corresponding to the exposure amount Ej. Further, the control section 40 opens the black shutter 26 for only a predetermined time by virtue of the above-described exposure amount Ej. As a result, an image positioned at the exposure position is printed on the photographic printing paper 28 with the above-described exposure amount Ej. Meanwhile, the processes of step 224 and step 226 correspond to the printing control means of the present invention.

As described above, in the photographic printing apparatus according to the first embodiment, when the face region extracted by the face-region extraction processing and displayed on the display 42 is not proper, the keyboard 44 is used to specify the substantially central position of the face region to be extracted by the crosshair cursor 52. The face region is extracted according to this specified position. For this reason, the face region to be extracted can be reliably extracted and optimum printing can be carried out by determining the exposure amount based on the extracted face region.

[Second Embodiment]

A description will be hereinafter given of a second embodiment of the present invention.

Figure 7A:
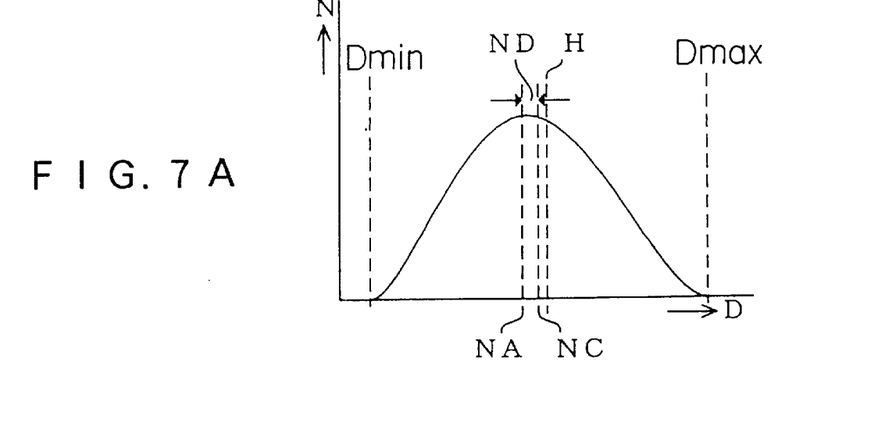
FIG. 7A is a density histogram which illustrate the principle of the scene determination processing of the second embodiment.
Figure 7B:
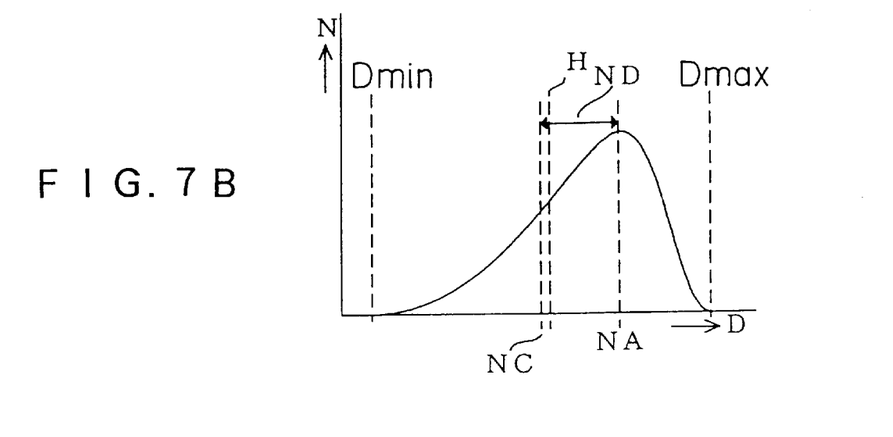
FIG. 7B is a density histogram which illustrate the principle of the scene determination processing of the second embodiment.
Figure 7C:
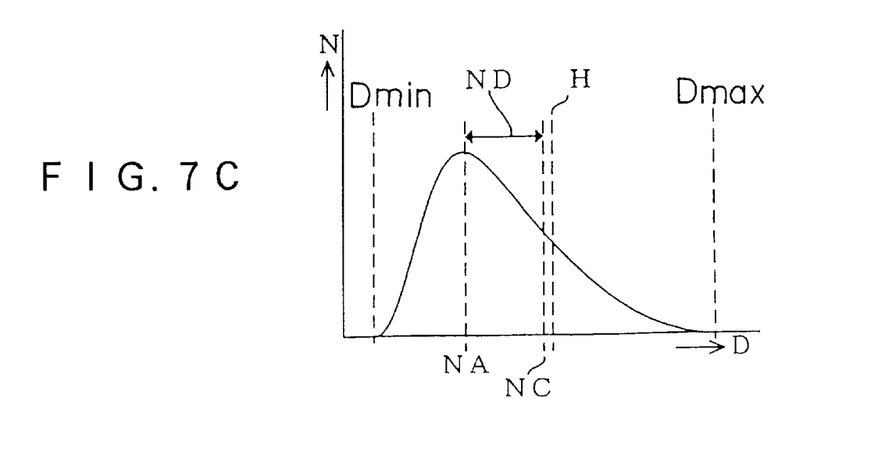
FIG. 7C is a density histogram which illustrate the principle of the scene determination processing of the second embodiment.

FIG. 7A is a density histogram of image data of an image in a proper state with no density correction required. FIG. 7B is a density histogram of image data when an image is recorded in an overexposure state or in a backlighting state, and FIG. 7C is a density histogram of image data when an image is recorded in an underexposure state or in a high-contrast state. In each of these density histograms, the x-axis indicates density and the y-axis indicates the number of pixels.

As shown in FIG. 7A, the average density H of a person in an image in a proper state is substantially the same as the average density NA of the entire image. However, as shown in FIG. 7B, the average density H of a person in an image recorded in an overexposure state or in a backlighting state is considerably lower than the average density NA of the entire image. Further, as shown in FIG. 7C, the average density H of a person in an image recorded in an underexposure state or in a high-contrast state is considerably higher than the average density NA of the entire image.

When an image is recorded in either an overexposure state, underexposure state, backlighting state, or a high-contrast state, the face region is generally extracted incorrectly very often in the face-region extraction process. Accordingly, in the second embodiment, it is determined whether an image has been recorded in any one of the above-described states. When it is determined that an image has not been recorded in any of the above states, it is assumed that the extraction result of the face region obtained by the face-region extraction process has high reliability, and based on the face region extracted by the face-region extraction processing, the exposure amount Ej is automatically determined and printing processing of the image is effected.

The second embodiment has the same structure as that of the first embodiment and a description thereof will be omitted. An operation of the second embodiment will be described hereinafter with reference to the flow chart shown in FIG. 5, which shows the printing control routine of the control section 40. It should be noted that, in the flow chart shown in FIG. 5, the same operations as those of the flow chart shown in FIG. 2 will be denoted by the same reference numerals, and a description thereof will be omitted or simplified.

When, in step 200, image data of an image positioned at an exposure position is fetched, in subsequent step 202, scene determination processing is effected in which it is determined whether automatic printing based on the fetched image data should proceed or not. The scene determination processing will be hereinafter described with reference to the flow chart shown in FIG. 6 and the density histograms shown in FIGS. 7A, 7B, and 7C.

Figure 6:
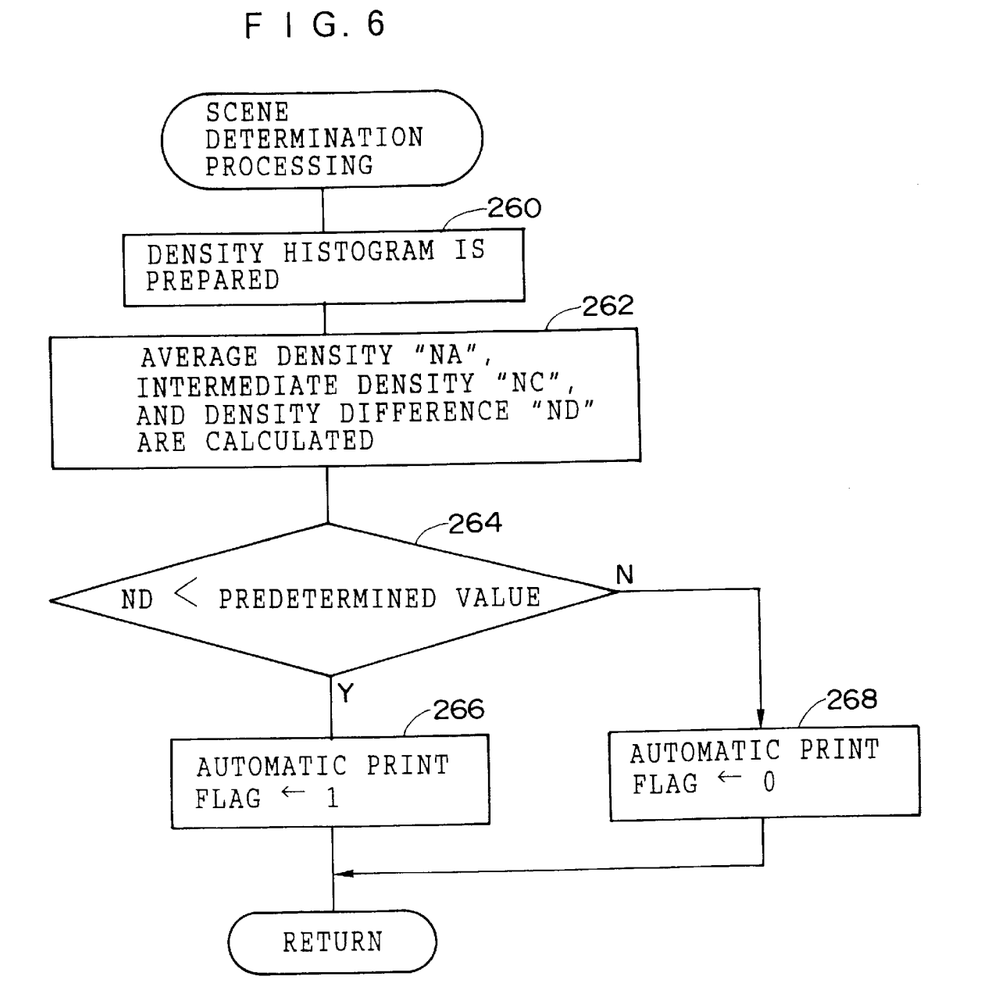
FIG. 6 is a flow chart which shows a flow of scene determination processing of the second embodiment.

First, in step 260, a density histogram of image data is prepared. In the subsequent step, 262, an average density NA and an intermediate density NC of image data (the intermediate density NC is an intermediate value between the minimum density Dmin and the maximum density Dmax of image data) are calculated, and thereafter, the difference in density ND is calculated as an absolute value of the difference between the average density NA and the intermediate density NC.

In step 264, it is determined whether the difference in density ND is smaller than a predetermined value. When the difference in density ND is smaller than the predetermined value, the image is recorded in a proper state as indicated by the density histogram shown in FIG. 7A and it is thereby determined that automatic printing is allowed. Then, in step 266, "1" is substituted for an automatic print flag and the process proceeds to step 204 of the flow chart shown in FIG. 5. On the other hand, when the difference in density ND is not smaller than the predetermined value, an image is recorded in the overexposure state or in the backlighting state as indicated by the density histogram shown in FIG. 7B or is recorded in the underexposure state or in the high-contrast state as indicated by the density histogram shown in FIG. 7C and it is thereby held that automatic printing should not proceed. Accordingly, in step 268, "0" is substituted for the automatic print flag and the process proceeds to step 204 of the flow chart shown in FIG. 5.

Figure 5:
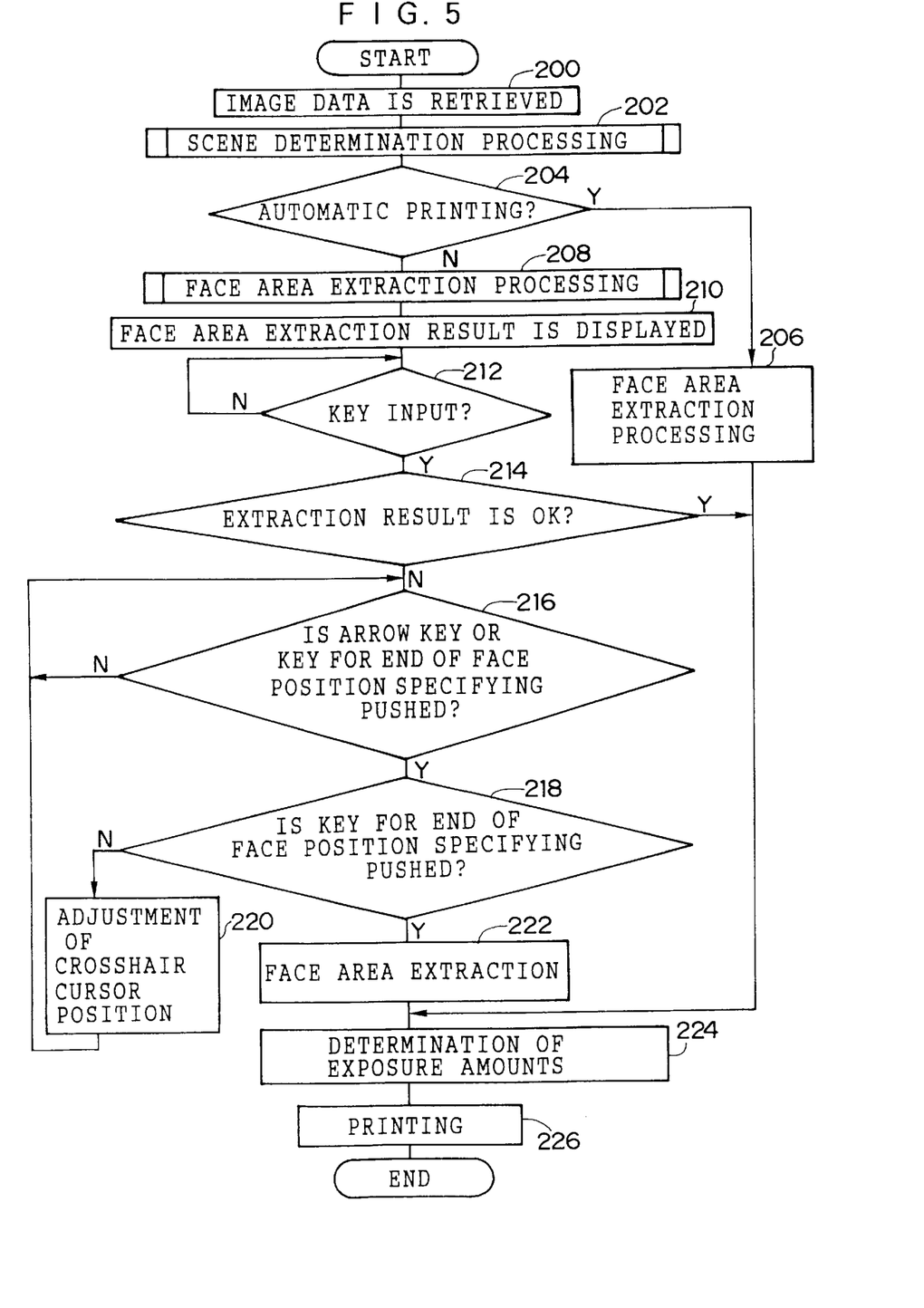
FIG. 5 is a flow chart which shows the flow of a printing control routine of a second embodiment of the present invention.

In step 204, it is determined whether a determination to allow automatic printing has been made in the scene determination processing of step 202 by referring to the automatic print flag. When the value of the automatic print flag is "0", automatic printing does not occur. In this case, the decision of step 204 is denied and the process proceeds to step 208. Subsequently, the respective processes of steps 208 to 226, which are the same as those of the first embodiment, are executed.

On the other hand, when the value of the automatic print flag is "1", automatic printing occurs. In this case, the decision of step 204 is confirmed and the process proceeds to step 206. After the same face-region extraction processing as step 208 of the first embodiment, the process proceeds to step 224, in which the exposure amount is determined based on the extraction result of a face region in step 206, and further, in step 226, the printing process is effected.

As described above in detail, the photographic printing apparatus according to the second embodiment has an effect which allows optimum printing processing to be carried out in the same way as in the first embodiment. Further, it is determined whether automatic printing occurs or not, based on the density histogram of image data, by the scene determination process. When it is determined that automatic printing is to be carried out, determination of exposure amount and the printing process are automatically effected with no indication of the extraction result on the display 42 and with no input of the position of the face region by the keyboard 44. For this reason, as compared with the photographic printing apparatus according to the first embodiment, the time taken to complete the printing process can be reduced.

[Third Embodiment]

Next, a third embodiment of the present invention will be described.

In an average photograph of people, the position of a person's face is usually located substantially at the central position of an image. For this reason, a determination about whether the extraction result of the face region in the face-region extraction processing is correct can be made to some degree based on whether the face region extracted by the face-region extraction processing is located near the central position of the image. Accordingly, in the third embodiment, it is determined whether the face region extracted by the face-region extraction processing is located near the central position of the image. When the face region is located near the central position of the image, it is supposed that the extraction result of the face region in the face-region extraction processing has high reliability, and the printing process is effected by automatically determining the exposure amount Ej based on the face region extracted by the face-region extraction process.

The third embodiment has the same structure as that of the first embodiment and a description thereof will be omitted. An operation of the third embodiment will be described hereinafter with reference to the flow chart shown in FIG. 8, which shows the printing control routine of the control section 40. It should be noted that in the flow chart shown in FIG. 8, the same operations as those of the flow chart shown in FIG. 2 will be denoted by the same reference numerals, and a description thereof will be omitted or simplified.

When image data of an image positioned at an exposure position is fetched in step 200, in the subsequent step 201, the same face-region extraction process as that of step 208 in FIG. 2 is effected.

When extraction of the face region is completed, in step 203, the second scene determination processing is effected as a determination means for determining whether automatic printing based on the extraction result of the face region extracted in step 201 may occur or not. The second scene determination process will be hereinafter described with reference to the flow chart shown in FIG. 9A.

Figure 9A:
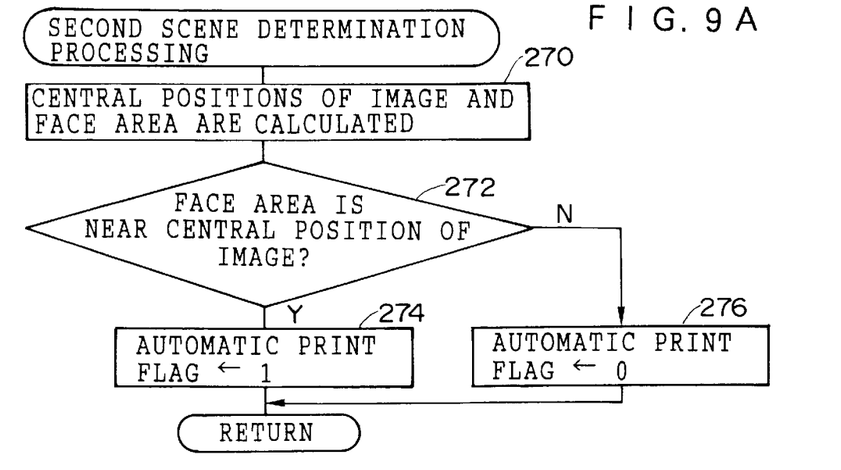
FIG. 9A is a flow chart which show the flow of second scene determination processing of the third embodiment.

First, in step 270, respective central positions of an image and the face region extracted in step 201 are calculated. In the subsequent step 272, it is determined whether the distance between the central position of the image and the central position of the face region, which positions are calculated in step 270, is smaller than a predetermined value. When the distance is smaller than the predetermined value, it is determined that the face region is located near the central position of the image. On the other hand, when the distance is larger than the predetermined value, it is determined that the face region is not located near the central position of the image.

When it is determined that the face region is located near the central position of the image as a result of the determination made in step 272, the process proceeds to step 274, in which "1" is substituted for an automatic print flag. When it is determined that the face region is not located near the central position of the image, the process proceeds to step 276, in which "0" is substituted for the automatic print flag. Subsequently, the process proceeds to step 204 of the flow chart shown in FIG. 8.

Figure 9B:
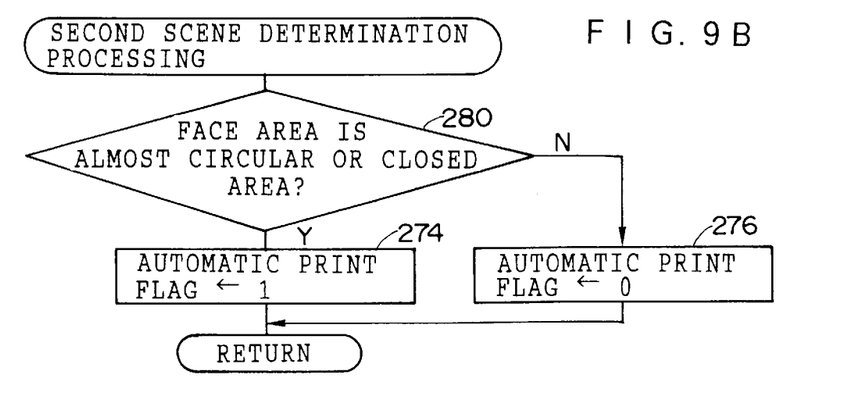
FIG. 9B is a flow chart which show the flow of second scene determination processing of the third embodiment.
Figure 9C:
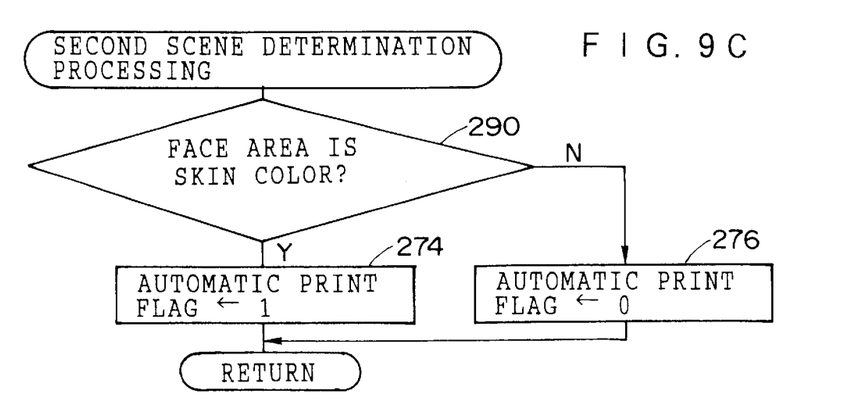
FIG. 9C is a flow chart which show the flow of second scene determination processing of the third embodiment.

Meanwhile, the above-described second scene determination process shown in the flow chart of FIG. 9A is merely illustrated as an example. Other methods may be used. FIGS. 9B and 9C each show a flow chart of other second scene determination processes, which will be outlined below.

As shown in FIG. 9B, in step 280, it is determined whether the face region extracted in step 201 is round (or a closed region) based on the outline of the face region extracted in the face-region extraction process. When the face region is round (or a closed region), in step 274, "1" is substituted for the automatic print flag. Further, when the face region is not round (or a closed region), in step 276, "0" is substituted for the automatic print flag.

In other words, the second scene determination process is a method which determines whether automatic printing is carried out or not based on whether the shape of the face region extracted by the face-region extraction processing is round (or a closed region).

On the other hand, in FIG. 9C, in step 290, it is determined whether the color of the face region extracted in step 201 is a skin color based on image data of the face region. When the color of the face region is a skin color, in step 274, "1" is substituted for the automatic print flag. When the color of the face region is not a skin color, in step 276, "0" is substituted for the automatic print flag.

In other words, the second scene determination processing shown in FIG. 9C is a method which determines whether automatic printing is carried out or not based on whether the color of the face region extracted by the face-region extraction processing is a skin color.

Figure 8:
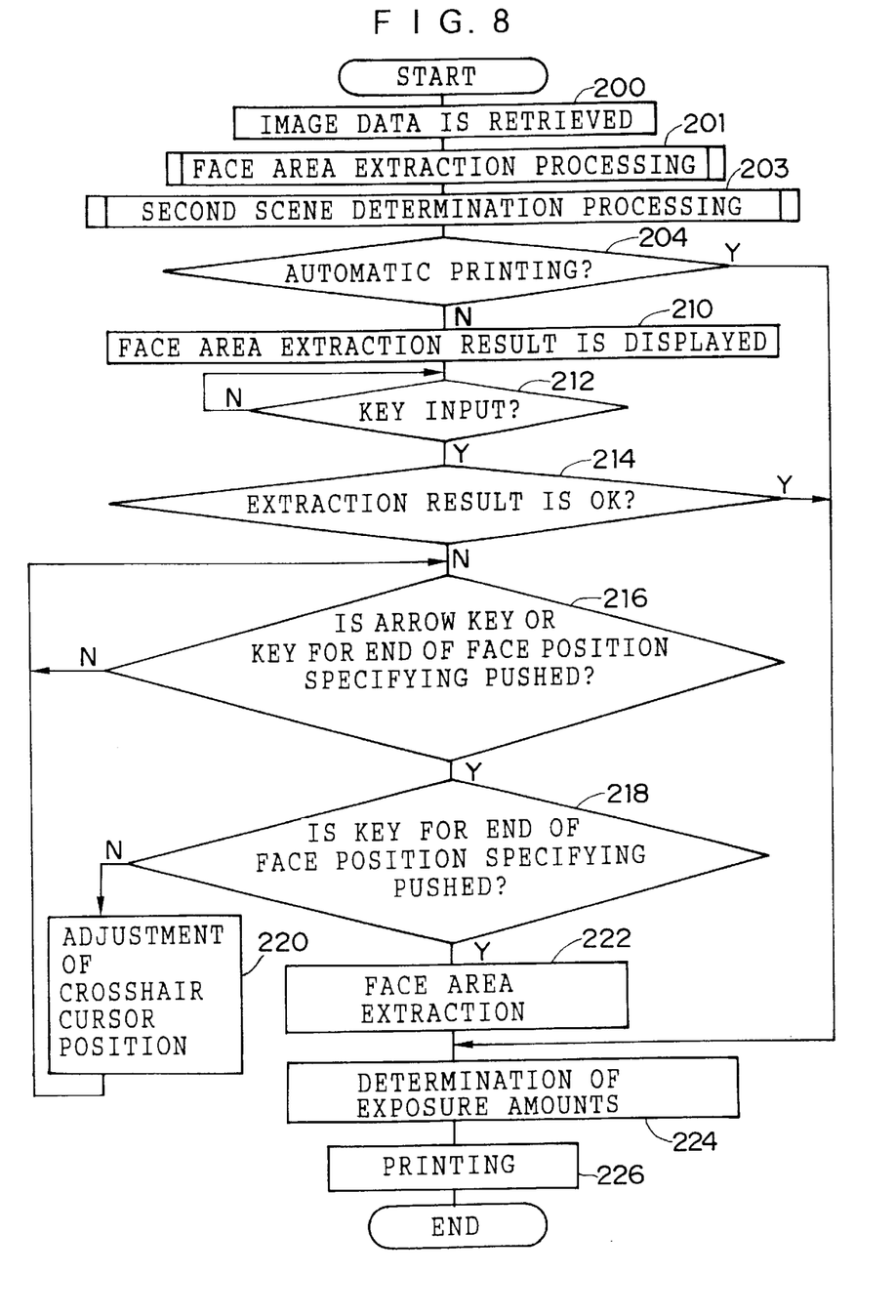
FIG. 8 is a flow chart which shows the flow of a printing control routine of a third embodiment of the present invention.

When the second scene determination process is completed, in step 204 shown in FIG. 8, it is determined whether automatic printing is carried out or not in the above-described second scene determination processing by referring to the automatic print flag. When the value of the automatic print flag set by the second scene determination processing is "0", it is determined that automatic printing is not carried out. In this case, the decision of step 204 is denied and the process proceeds to step 210. After this, the processes of steps 210 to 226 which are the same as those of the first embodiment are executed.

On the other hand, when the value of the automatic print flag set according to the second scene determination process is "1", automatic printing is carried out. In this case, the decision of step 204 is confirmed and the process proceeds to step 224, in which the exposure amount is determined based on the extraction result of the face region in step 201. The printing process is effected in step 226.

As described above, the photographic printing apparatus according to the third embodiment has the effect of allowing optimum printing in the same way as in the first embodiment. Further, it is determined whether automatic printing is carried out or not, based on the extraction result of the face region obtained by the face-region extraction processing, in the second scene determination process. When it is determined that automatic printing is carried out, determination of exposure amount and printing processing are automatically effected with no indication of the extraction result on the display 42 and with no input of the position of the face region on the keyboard 44. For this reason, as compared with the photographic printing apparatus according to the first embodiment, the time taken to complete the printing process can be reduced in the same way as in the second embodiment.

Meanwhile, in each of the above-described embodiments, although the case was described in which the principal portion to be extracted is a person's face, the present invention is not limited to the same and a desired portion of which color reproduction is required most faithfully in an image may also be used. In this case, it is necessary to replace the face-region extraction process in each of the embodiments by a process for extracting the desired portion.

Further, in each of the above-described embodiments, the case was described in which when the face region is specified, the substantially central position of the face region is specified by using a crosshair cursor, and the person's outline region including the specified position is set as the face region, but the present invention is not limited to the same. For example, there may also be used a method in which a skin color portion of a face region is enclosed by a rectangular frame of an arbitrary size, image data of multiple pixels within the enclosed rectangular frame is extracted, and the average density of the extracted image data is used, as the face-region average density FD, for calculation of exposure amount.

Moreover, in each of the above-described embodiments, as the method for indicating the extraction result of the face region obtained by the face-region extraction process, there was described a case in which an entire image is displayed on the display and a substantially circular mark is given for an image region corresponding to the extracted face region. However, the present invention is not limited to the same, and for example, the extracted face region and its peripheral region may be specifically displayed.

What is claimed is:

1. An image processing apparatus comprising:
   first principal portion extracting means which extracts a principal portion of an image on the basis of image data;
   display means which displays an extraction result of the principal portion of the image extracted by said first principal portion extracting means;
   input means for inputting first instruction information for indicating whether the extraction result displayed on said display means is correct and also inputting second instruction information for indicating a region to be newly extracted as a principal portion; and
   second principal portion extracting means which extracts a new principal portion on the basis of the second instruction information inputted by said input means.

2. An image processing apparatus according to claim 1, wherein the principal portion of the image extracted by said first principal portion extracting means is a person's face.

3. An image processing apparatus according to claim 1, wherein said input means includes first instruction information input means for inputting the first instruction information and also includes second instruction information input means for inputting the second instruction information.

4. An image processing apparatus according to claim 3, wherein when it is indicated that the extraction result displayed on said display means is not correct, said second instruction information input means acts as said first instruction information input means.

5. An image processing apparatus according to claim 1, wherein said first principal portion extracting means is applied in combination with one of a plurality of face region candidate extracting systems for extracting the principal portion of the image.

6. The image processing apparatus according to claim 1, wherein said second principal portion extracting means extracts the new principal portion when the first instruction information indicates that the extraction result displayed on said display means is incorrect.

7. A photographic printing apparatus comprising:

photometric means which photometrically measures an image recorded on a photographic film;

first principal portion extracting means which extracts a principal portion of the image on the basis of photometric data obtained by said photometric means;

display means which displays an extraction result of the principal portion of the image extracted by said first principal portion extracting means;

input means for inputting first instruction information for indicating whether printing is to be initiated and also for inputting second instruction information for indicating a region to be newly extracted as a principal portion;

second principal portion extracting means which extracts a new principal portion on the basis of the second instruction information inputted by said input means; and printing control means for controlling printing in which when the first instruction information which indicates that the printing is to be initiated is inputted by said input means, an exposure amount is determined based on photometric data of the principal portion of the image extracted by said first principal portion extracting means, and when the second instruction information is inputted, an exposure amount is determined based on photometric data of the principal portion of the image extracted by said second principal portion extracting means.

8. A photographic printing apparatus according to claim 7, wherein the principal portion of the image extracted by said first principal portion extracting means is a person's face.

9. A photographic printing apparatus according to claim 7, wherein said input means includes first instruction information input means for inputting the first instruction information and also includes second instruction information input means for inputting the second instruction information.

10. A photographic printing apparatus according to claim 9, wherein when it is indicated by said input means that printing is not to be initiated, said second instruction information input means acts as said first instruction information input means.

11. A photographic printing apparatus according to claim 7, wherein said first principal portion extracting means is applied in combination with one of a plurality of face region candidate extracting systems for extracting the principal portion of the image.

12. A photographic printing apparatus comprising:

photometric means which photometrically measures an image recorded on a photographic film;

first principal portion extracting means which extracts a principal portion of the image on the basis of photometric data obtained by said photometric means;

determination means which determines whether printing is automatically initiated based on at least one of the photometric data obtained by said photometric means and an extraction result obtained by said first principal portion extracting means;

display means which, when printing is not automatically initiated, displays the extraction result of the principal portion of the image extracted by said first principal portion extracting means;

input means for inputting, with the extraction result of the principal portion of the image extracted by said first principal portion extracting means being displayed on said display means, first instruction information for indicating whether printing is to be initiated and second instruction information for indicating a region to be newly extracted as a principal portion;

second principal portion extracting means for extracting a new principal portion on the basis of the second instruction information inputted by said input means; and printing control means for controlling printing in which when one of the first instruction information which indicates that printing is to be initiated is inputted by said input means and when it is determined by said determination means that printing is to be automatically initiated, an exposure amount is determined based on photometric data of the principal portion of the image extracted by said first principal portion extracting means, and when the second instruction information is inputted, an exposure amount is determined based on photometric data of the principal portion of the image extracted by said second principal portion extracting means.

13. A photographic printing apparatus according to claim 12, wherein the principal portion of the image extracted by said first principal portion extracting means is a person's face.

14. A photographic printing apparatus according to claim 12, wherein said input means is formed from first instruction information input means for inputting the first instruction information which indicates that printing is to be initiated and second instruction information input means for inputting the second instruction information.

15. A photographic printing apparatus according to claim 14, wherein when it is indicated by said input means that the printing is not to be initiated, said second instruction information input means acts as said first instruction information input means.

16. A photographic printing apparatus according to claim 11, wherein said first principal portion extracting means is applied in combination with one of a plurality of face region candidate extracting systems for extracting the principal portion of the image.

17. A photographic printing apparatus according to claim 12, wherein said determination means is provided to determine whether printing is to be automatically initiated based on image density obtained by said photometric means.

18. A photographic printing apparatus according to claim 13, wherein said determination means is provided to determine whether printing is to be automatically initiated based on the position of a face region extracted by said first principal portion extracting means.

19. A photographic printing apparatus according to claim 13, wherein said determination means is provided to determine whether printing is to be automatically initiated based on the shape of a face region extracted by said first principal portion extracting means.

20. A photographic printing apparatus according to claim 13, wherein said determination means is provided to determine whether printing is to be automatically initiated based on the color of a face region extracted by said first principal portion extracting means.

* * * * *